United States Patent (10) Patent No.: US 8,397,280 B1
Zhu et al. (45) Date of Patent: Mar. 12, 2013

(54) STATIC PACKET ADDRESS ASSIGNMENT FOR A WIRELESS COMMUNICATION DEVICE BY AN AUTHORIZATION SYSTEM

(75) Inventors: Lei Zhu, Overland Park, KS (US); Daniel J. Pope, Overland Park, KS (US); Terry Daniel Nebergall, Gardner, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 310 days.

(21) Appl. No.: 12/841,853

(22) Filed: Jul. 22, 2010

(51) Int. Cl.
H04L 9/32 (2006.01)

(52) U.S. Cl. .................................. 726/4; 726/7

(58) Field of Classification Search .................... None
See application file for complete search history.

(56) References Cited

U.S. PATENT DOCUMENTS

| | | | |
|---|---|---|---|
| 6,374,108 B1 | 4/2002 | Jakobsen et al. | |
| 7,277,416 B1 | 10/2007 | Chang et al. | |
| 7,346,684 B2 | 3/2008 | Borella | |
| 2003/0002480 A1 | 1/2003 | Giustina et al. | |
| 2006/0268907 A1 | 11/2006 | Lee et al. | |
| 2007/0064653 A1 | 3/2007 | Jang et al. | |
| 2007/0086383 A1 | 4/2007 | Watanabe et al. | |
| 2007/0160017 A1 | 7/2007 | Meier et al. | |
| 2007/0254648 A1 | 11/2007 | Zhang et al. | |
| 2008/0130537 A1 | 6/2008 | Kim et al. | |
| 2011/0087789 A1* | 4/2011 | Savolainen et al. | 709/228 |

* cited by examiner

Primary Examiner — Jeffrey Pwu
Assistant Examiner — Nega Woldemariam

(57) ABSTRACT

An authorization system in a home wireless network comprises a communication interface and a processing system, wherein a wireless communication device associated with the home wireless network transfers a network service request to a service node to acquire a static packet address for the wireless communication device. The communication interface is configured to receive an authorization request for the wireless communication device, transfer a query for delivery to a user profile system, receive a packet address of a home agent associated with the wireless communication device, transfer an authorization response, and receive an authentication request transferred from the home agent. The processing system is configured to process the authentication request to determine the static packet address for the wireless communication device. The communication interface is configured to transfer an authentication response for delivery to the home agent, wherein the authentication response includes the static packet address for the wireless communication device.

18 Claims, 7 Drawing Sheets

STATIC PACKET ADDRESS ASSIGNMENT FOR A WIRELESS COMMUNICATION DEVICE BY AN AUTHORIZATION SYSTEM

TECHNICAL BACKGROUND

Wireless communication networks typically include wireless communication devices which, via a wireless access node, communicate with further communication networks and equipment. Recently, a growing demand for mobile high speed data transfers has resulted in the development of several internet protocol (IP) mobility protocols. These IP mobility solutions attempt to solve the problem of a wireless communication device roaming within a network by providing location-independent routing of data packets.

One IP mobility standard is Mobile IP, which is typically utilized in third generation (3G) wireless access networks. Under Mobile IP, a wireless communication device is associated with a home wireless network and an anchored home IP address. The home wireless network includes a home agent that stores information about the wireless communication device. When the wireless communication device roams into a foreign wireless network, the device is associated with a care-of-address which identifies its current location, and the home address is associated with the local endpoint of a tunnel to the home agent. Mobile IP specifies how a wireless communication device registers with its home agent and how the home agent routes packets to and from the wireless device through the tunnel.

Simple IP is another example of an IP mobility solution typically employed in fourth generation (4G) wireless networks. Under the simple IP protocol, a wireless communication device receives a dynamic IP from a local access router in a visited wireless network, and the visited wireless network provides a direct routing service for the wireless communication device. Unless the wireless communication device requires a static IP address, a new IP address is typically acquired (and existing connections are lost) every time the device changes its point of attachment.

While the standard IP mobility protocols work well when roaming within different subnets of a network or within different networks utilizing the same IP mobility scheme, a problem arises when a static IP address is required for a dual-mode wireless communication device capable of communicating with two different wireless access networks. For example, 3G and 4G wireless networks are typically built on fundamentally different access technologies and handle static IP address assignment using different techniques. However, when a user of a dual-mode wireless communication device subscribes to a static IP service, the device should always receive the same static IP address, regardless of whether the device accesses a 3G network or a 4G network.

OVERVIEW

A method of operating an authorization system in a home wireless network is disclosed, wherein a wireless communication device associated with the home wireless network transfers a network service request to a service node to acquire a static packet address for the wireless communication device. The method comprises receiving a first authorization request for the wireless communication device, wherein the first authorization request includes a user identifier, transferring a first query for delivery to a user profile system, wherein the first query includes the user identifier, receiving a packet address of a home agent associated with the wireless communication device and the static packet address for the wireless communication device in response to the first query, transferring a first authorization response, wherein the first authorization response includes the packet address of the home agent, receiving an authentication request transferred from the home agent, wherein the authentication request includes the user identifier, processing the authentication request to determine the static packet address for the wireless communication device, and transferring an authentication response for delivery to the home agent, wherein the authentication response includes the static packet address for the wireless communication device, and wherein the home agent is configured to transfer a registration response comprising the static packet address for delivery to the service node.

An authorization system in a home wireless network comprises a communication interface and a processing system, wherein a wireless communication device associated with the home wireless network transfers a network service request to a service node to acquire a static packet address for the wireless communication device. The communication interface is configured to receive a first authorization request for the wireless communication device, wherein the first authorization request includes a user identifier. The communication interface is further configured to transfer a first query for delivery to a user profile system, wherein the first query includes the user identifier, receive a packet address of a home agent associated with the wireless communication device and the static packet address for the wireless communication device in response to the first query, and transfer a first authorization response, wherein the first authorization response includes the packet address of the home agent. The processing system is configured to direct the communication interface to receive the first authorization request for the wireless communication device, transfer the first query for delivery to the user profile system, receive the packet address of the home agent associated with the wireless communication device and the static packet address for the wireless communication device, and transfer the first authorization response. The communication interface is configured to receive an authentication request transferred from the home agent, wherein the authentication request includes the user identifier. The processing system is configured to process the authentication request to determine the static packet address for the wireless communication device. The communication interface is configured to transfer an authentication response for delivery to the home agent, wherein the authentication response includes the static packet address for the wireless communication device, and wherein the home agent is configured to transfer a registration response comprising the static packet address for delivery to the service node.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
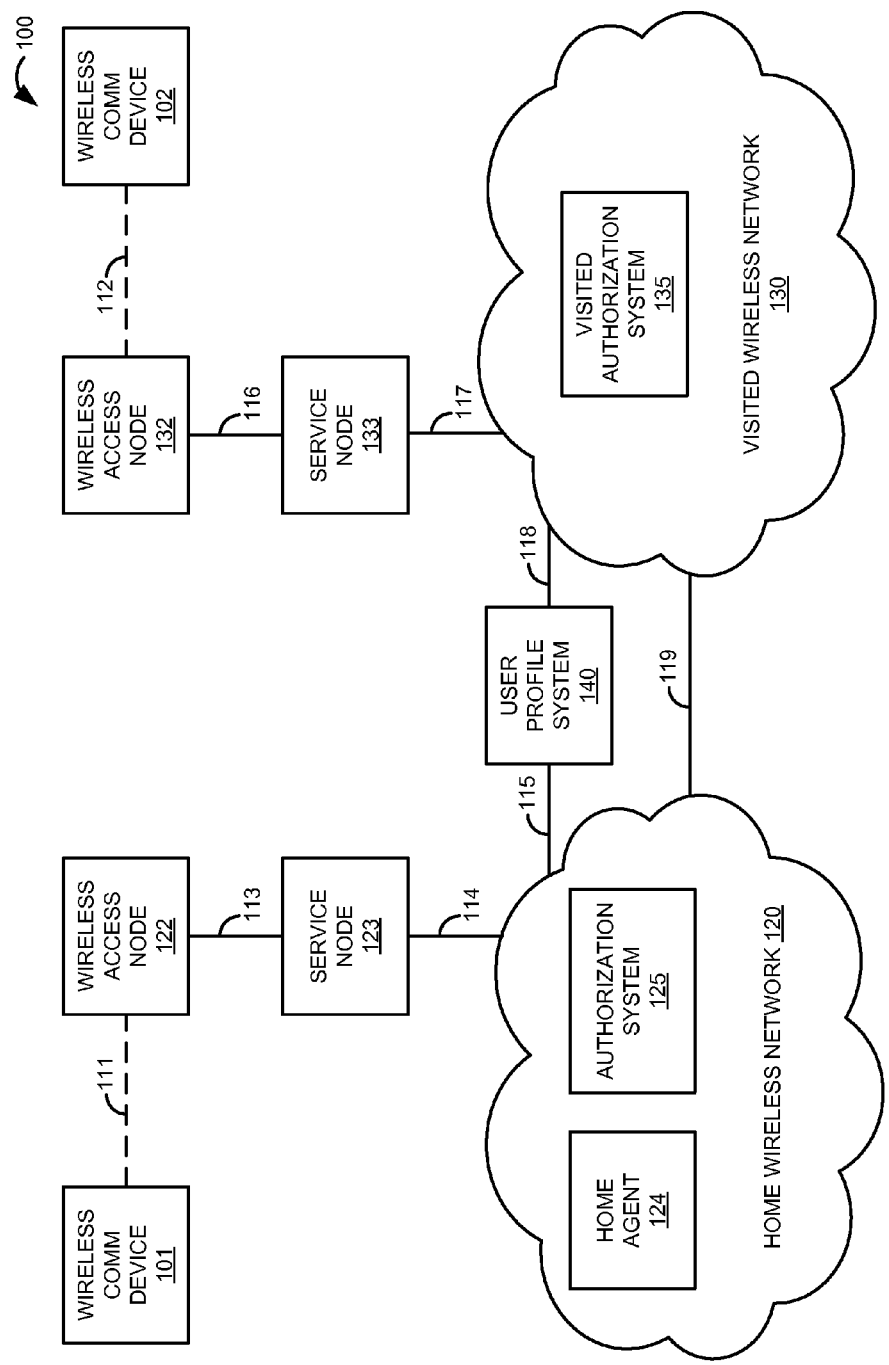
FIG. 1 is a block diagram that illustrates a communication system.

FIG. 1 is a block diagram that illustrates communication system 100. Communication system 100 includes wireless communication devices 101 and 102, wireless access nodes 122 and 132, service nodes 123 and 133, home wireless network 120, visited wireless network 130, and user profile system 140. Home wireless network 130 includes home agent 124 and authorization system 125. Visited wireless network 130 includes visited authorization system 135. Wireless communication device 101 communicates with wireless access node 122 over wireless communication link 111. Likewise, wireless communication device 102 communicates with wireless access node 132 over wireless communication link 112. Wireless access nodes 122 and 132 are in communication with respective service nodes 123 and 133 over respective communication links 113 and 116. Service node 123 is in communication with home wireless network 120 over communication link 114, while service node 133 communicates with visited wireless network 130 over communication link 117. Home wireless network 120 and visited wireless network 130 are in communication over communication link 119. In addition, home wireless network 120 and visited wireless network 130 communicate with user profile system 140 over respective communication links 115 and 118.

Figure 2:
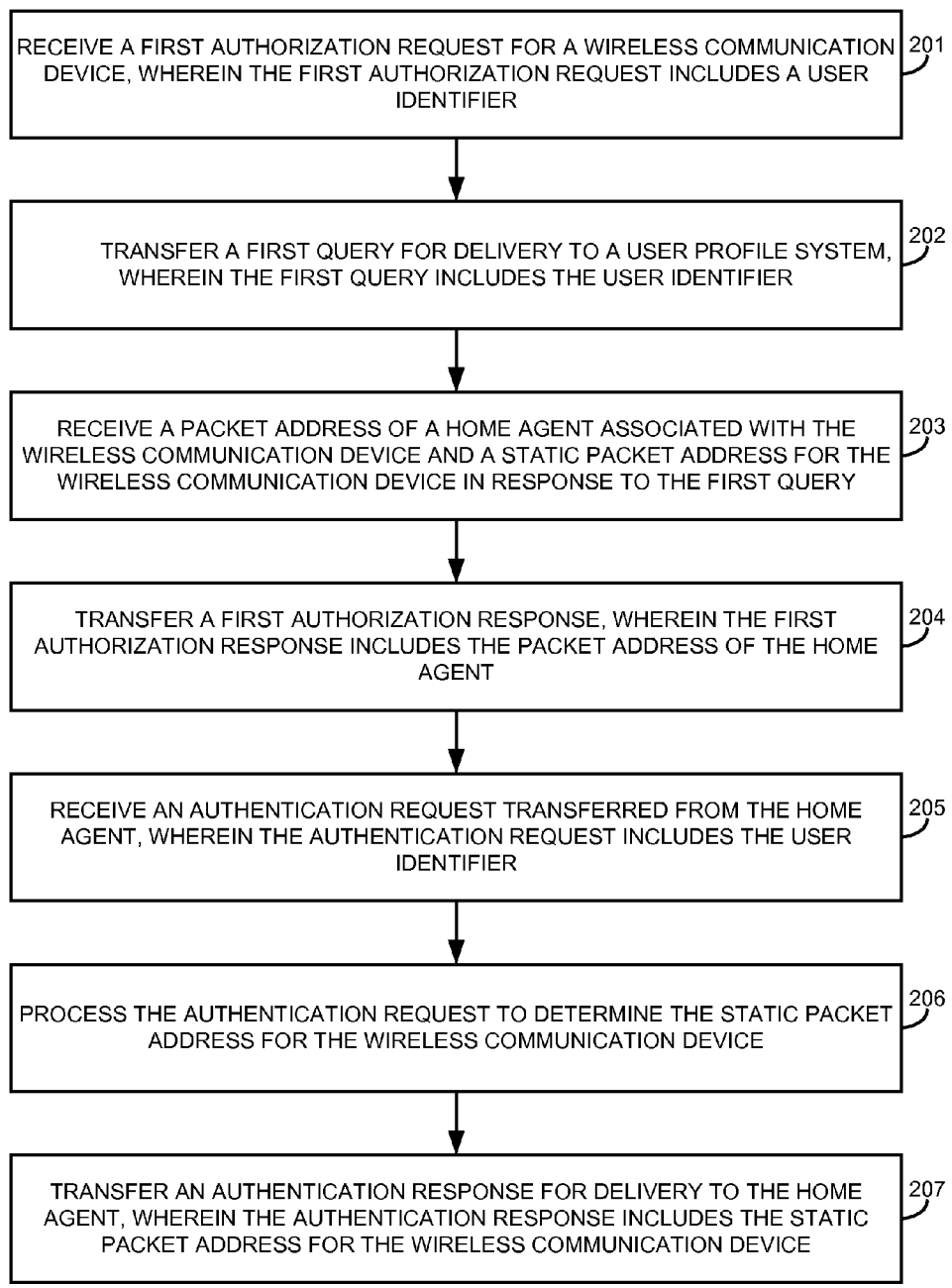
FIG. 2 is a flow diagram that illustrates an operation of the communication system.

FIG. 2 is a flow diagram that illustrates an operation of communication system 100. The steps of the operation are indicated below parenthetically. The exemplary operation shown in FIG. 2 depicts a method of operating authorization system 125 in home wireless network 120. In this example, both wireless communication devices 101 and 102 are associated with home wireless network 120 and home agent 124. However, wireless communication device 101 is operating in its home region and communicates with home wireless network 120 via wireless access node 122, while wireless communication device 102 is operating in a visited region and communicates with visited wireless network 130 via wireless access node 132. To acquire a static packet address, each wireless communication device 101 and 102 typically transfers a network service request to a respective service node 123 or 133.

As shown in FIG. 2, authorization system 125 in home wireless network 120 receives a first authorization request for a wireless communication device 101 or 102 (201). The first authorization request includes a user identifier (201). Authorization system 125 could receive the first authorization request from any system, device, node, or network, including those not shown on FIG. 1. In one example, authorization system 125 receives the first authorization request for wireless communication device 101 transmitted from service node 123. In another example, authorization system 125 receives the first authorization request for wireless communication device 102 transmitted from visited authorization system 135. Typically, the authorization request received by authorization system 125 instructs authorization system 125 to authenticate and authorize wireless communication device 101 or 102 for access to a communication network. The authorization request could comprise any message in any protocol, but in some examples, authorization system 125 receives the first authorization request in a remote authentication dial in user service (RADIUS) request message, such as an Access-Request message in the RADIUS networking protocol. In other examples, authorization system 125 receives the first authorization request in a diameter request message, such as an AA-Request or a Diameter-EAP-Request in the diameter networking protocol.

The user identifier included in the first authorization request could comprise a unique identifier that identifies wireless communication device 101 or 102 or its respective user. For example, the user identifier could comprise a Mobile Station International Subscriber Directory Number (MSISDN) or some other telephone number, Electronic Serial Number (ESN), Mobile Station Identifier (MSID), Mobile Equipment Identifier (MEID), International Mobile Equipment Identity (IMEI), International Mobile Subscriber Identity (IMSI), Media Access Control Identifier (MACID), User Name Identifier (UID), or some other identifier that uniquely identifies wireless communication device 101 or 102 and/or a user of device 101 or 102.

Authorization system 125 transfers a first query for delivery to user profile system 140, wherein the first query includes the user identifier (202). Typically, user profile system 140 processes the user identifier included in the first query to determine a packet address of the home agent 124 associated with a respective wireless communication device 101 or 102 depending on which device is identified by the user identifier. User profile system 140 also typically processes the user identifier to determine a static packet address for the wireless communication device 101 or 102, for example, by looking up the static packet address in a relational database based on the user identifier. Authorization system 125 then receives the packet address of the home agent 124 associated with the wireless communication device 101 or 102 and the static packet address for the wireless communication device 101 or 102 in response to the first query (203).

In some examples, authorization system 125 is configured to process the packet address of the home agent 124 and the static packet address for wireless communication device 101 or 102 to determine an error event. For example, authorization system 125 could process the packet address of the home agent 124 and the static packet address to determine the error event by determining that a packet address pool of the home agent 124 does not include the static packet address for the wireless communication device 101 or 102. In other examples, the error event could occur if authorization system 125 does not receive both the packet address of the home agent 124 and the static packet address for wireless communication device 101 or 102. However, note that in some examples, authorization system 125 may only receive the packet address of the home agent 124 in response to the first query, so an error event would not occur in this case.

Referring again to FIG. 2, authorization system 125 transfers a first authorization response, wherein the first authorization response includes the packet address of the home agent (204). Authorization system 125 typically transfers the first authorization response for delivery to the system or node from which it received the first authorization request, but authorization system 125 could transfer the first authorization response to any system, device, node, or network, including those not shown on FIG. 1. In one example, authorization system 125 transfers the first authorization response for wireless communication device 101 for delivery to service node 123. In another example, authorization system 125 transfers the first authorization response for wireless communication device 102 for delivery to visited authorization system 135. The authorization response could comprise any message in any protocol, but in some examples, authorization system 125 transfers the first authorization response in a RADIUS response message, such as an Access-Accept message in the RADIUS networking protocol. In other examples, authorization system 125 transfers the first authorization response in a diameter response message, such as an AA-Answer or a Diameter-EAP-Answer in the diameter networking protocol.

Authorization system 125 receives an authentication request transferred from the home agent 124, wherein the authentication request includes the user identifier (205). The authentication request could comprise any message in any protocol, but in some examples, authorization system 125 could receive the authentication request in a RADIUS or diameter request message. The authentication request includes the user identifier and, in some examples, could indicate to authorization system 125 a request for the static packet address for wireless communication device 101 or 102.

Authorization system 125 processes the authentication request to determine the static packet address for the wireless communication device 101 or 102 (206). Authorization system 125 typically retrieves the static packet address based on the user identifier included in the authentication request from the home agent 124. In some examples, authorization system 125 could store or cache the static packet address for the wireless communication device 101 or 102 if received in the response to the first query to user profile system 140 in operation 203. In other examples, authorization system 125 could transfer a second query for delivery to user profile system 140 to acquire the static packet address for wireless communication device 101 or 102 based on the user identifier. In any event, authorization system 125 ultimately determines the static packet address for the wireless communication device 101 or 102 identified by the user identifier.

Authorization system 125 transfers an authentication response for delivery to the home agent 124, wherein the authentication response includes the static packet address for the wireless communication device 101 or 102 (207). Typically, the home agent 124 is configured to transfer a registration response comprising the static packet address for delivery to the service node 123 or 133 for wireless communication device 101 or 102, respectively. Further, the wireless communication device 101 or 102 would typically receive a network service response transmitted from the respective service node 123 or 133 to complete the acquisition of the static packet address.

Advantageously, authorization system 125 and user profile system 140 enable wireless communication devices 101 and 102 to each acquire a static packet address, regardless of their physical locations or the type of network used to communicate with authorization system 125. By storing the static packet addresses for communication devices 101 and 102 in user profile system 140, authorization system 125 can be configured to query system 140 to acquire the static packet address for one of the devices 101 or 102 based on a user identifier included in an authentication request. In this manner, the wireless communication device 101 or 102 associated with the user identifier will always receive the same packet address when requesting network service from any network, whether the network comprises home wireless network 120, visited wireless network 130, a third generation (3G) or fourth generation (4G) wireless network, or any other radio access network.

Referring back to FIG. 1, wireless communication devices 101 and 102 each comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory device, software, processing circuitry, or some other communication components. For example, wireless communication device 101 or 102 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. In some examples, wireless communication devices 101 and 102 comprise dual-mode communication devices capable of communicating with both 3G and 4G wireless networks. Wireless network protocols that may be utilized by wireless communication devices 101 and 102 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 101 and 102 and respective wireless access nodes 122 and 132—including combinations thereof.

Wireless access nodes 122 and 132 comprise RF communication circuitry and an antenna. The RF communication circuitry typically includes an amplifier, filter, RF modulator, and signal processing circuitry. Wireless access nodes 122 and 132 may also comprise a router, server, memory device, software, processing circuitry, cabling, power supply, network communication interface, structural support, or some other communication apparatus. Wireless access nodes 122 and 132 could comprise a base station, Internet access node, telephony service node, wireless data access point, or some other wireless communication system—including combinations thereof. Some examples of wireless access nodes 122 and 132 include a base transceiver station (BTS), base station controller (BSC), radio network controller (RNC), radio base station (RBS), Node B, enhanced Node B (eNode B), and others. Wireless network protocols that may be utilized by wireless access nodes 122 and 132 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Service nodes 123 and 133 comprise a computer system and communication interface. Service nodes 123 and 133 may also include other components such as a router, server, data storage system, and power supply. Service nodes 123 and 133 may each reside in a single device or may be distributed across multiple devices. Service nodes 123 and 133 may be discrete systems or may be integrated within other systems—including other systems within communication system 100. Service nodes 123 and 133 could comprise a packet gateway, packet data serving node (PDSN), serving general packet radio service (GPRS) support node (SGSN), access service network (ASN) gateway, serving gateway, mobile switching center, network gateway system, Internet access node, application server, firewall, or some other communication system—including combinations thereof.

Home wireless network 120 comprises the core network of a wireless communication provider, and could include routers, gateways, telecommunication switches, servers, processing systems, or other communication equipment and systems for providing communication and data services. Likewise, visited wireless network 130 comprises the core network of a wireless communication provider, and could include routers, gateways, telecommunication switches, servers, processing systems, or other communication equipment and systems for providing communication and data services. Wireless networks 120 and 130 could comprise wireless communication nodes, telephony switches, Internet routers, network gateways, computer systems, communication links, or some other type of communication equipment—including combinations thereof. Wireless networks 120 and 130 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Wireless networks 120 and 130 may be configured to communicate over metallic, wireless, or optical links. In some examples, wireless networks 120 and 130 could comprise 3G and/or 4G wireless networks. Wireless networks 120 and 130 may be configured to use time-division multiplexing (TDM), Internet Protocol (IP), Ethernet, optical networking, wireless protocols, communication signaling, or some other communication format—including combinations thereof. In some examples, wireless networks 120 and 130 include further access nodes and associated equipment for providing communication services to many wireless communication devices across a large geographic region.

Home agent 124 comprises a computer system and communication interface. Home agent 124 may also include other components such a router, server, data storage system, and power supply. Home agent 124 may reside in a single device or may be distributed across multiple devices. Home agent 124 may be a discrete system or may be integrated within other systems—including other systems within home wireless network 120. Home agent 124 could comprise a router, packet gateway, mobile switching center, network gateway system, Internet access node, application server, service node, firewall, or some other communication system—including combinations thereof.

Authorization systems 125 and 135 each comprise a computer system and communication interface. Authorization systems 125 and 135 may also include other components such a router, server, data storage system, and power supply. Authorization systems 125 and 135 may each reside in a single device or may be distributed across multiple devices. Authorization system 125 may be a discrete system or may be integrated within other systems—including other systems within home wireless network 120. Likewise, authorization system 135 may be a discrete system or may be integrated within other systems—including other systems within visited wireless network 130. Authorization systems 125 and 135 could comprise an authentication, authorization, and accounting (AAA) server, packet gateway, mobile switching center, network gateway system, Internet access node, application server, service node, firewall, or some other communication system—including combinations thereof. Authorization systems 125 and 135 are in communication with user profile system 140 over respective communication links 115 and 118.

User profile system 140 comprises a computer system and communication interface. User profile system 140 may also include other components such a router, server, data storage system, and power supply. User profile system 140 may reside in a single device or may be distributed across multiple devices. User profile system 140 may be a discrete system or may be integrated within other systems—including other systems or networks within communication system 100. User profile system 140 could comprise a provisioning system, database system, home subscriber server (HSS), user profile server function (UPSF), mobile switching center, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication links 111 and 112 may comprise many different signals sharing the same link. For example, wireless communication links 111 and 112 could each include multiple signals operating in a single propagation path comprising multiple communication sessions, frequencies, timeslots, transportation ports, logical transportation links, network sockets, IP sockets, packets, or communication directions—including combinations thereof.

Communication links 113-119 use metal, air, space, optical fiber such as glass or plastic, or some other material as the transport media—including combinations thereof. Communication links 113-119 could use various communication protocols, such as TDM, IP, Ethernet, telephony, optical networking, hybrid fiber coax (HFC), communication signaling, wireless protocols, or some other communication format—including combinations thereof. Communication links 113-119 may be direct links or could include intermediate networks, systems, or devices.

Figure 3:
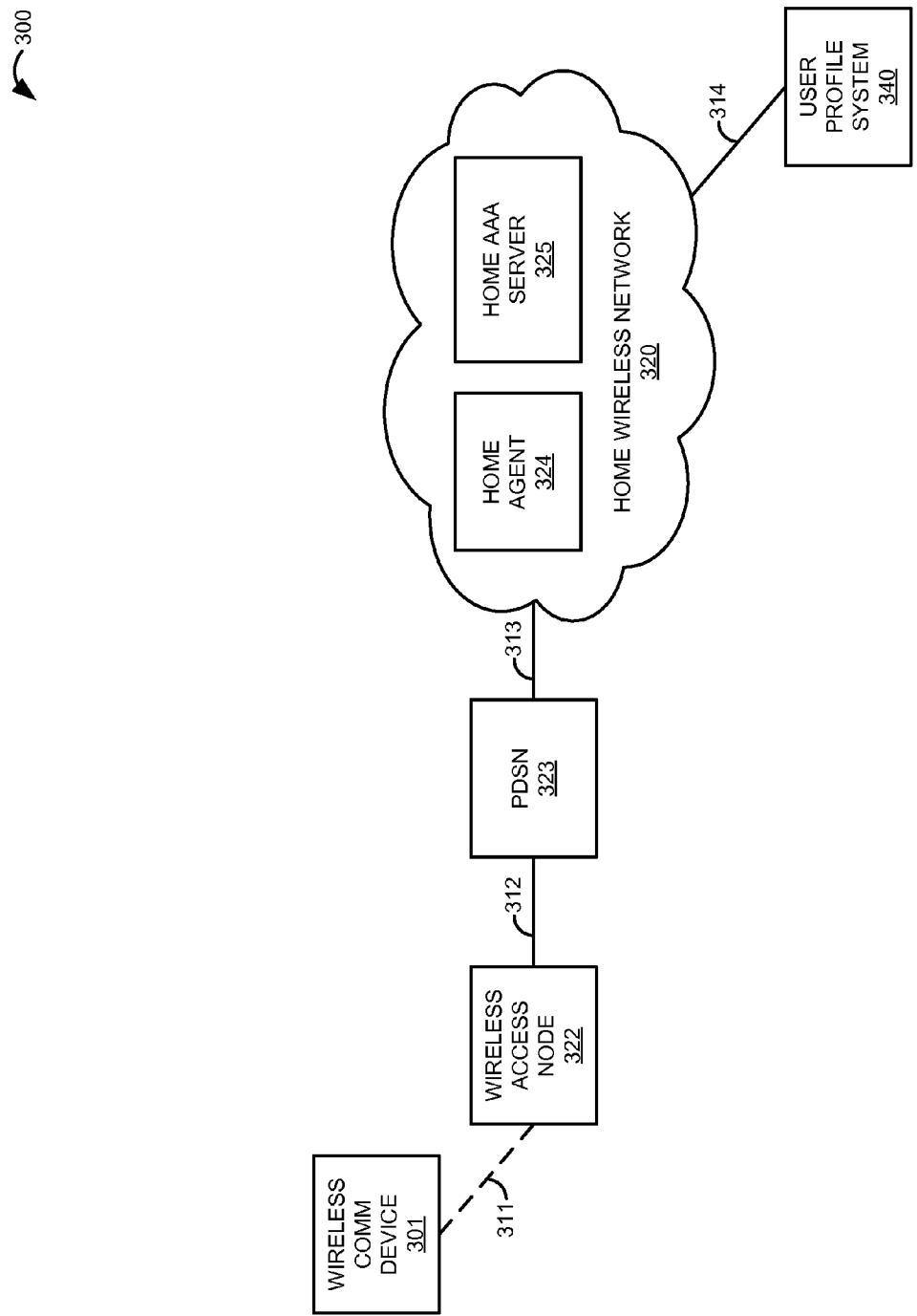
FIG. 3 is a block diagram that illustrates a communication system in an exemplary embodiment.

FIG. 3 is a block diagram that illustrates communication system 300 in an exemplary embodiment. Communication system 300 includes wireless communication device 301, wireless access node 322, packet data serving node (PDSN) 323, home wireless network 320, and user profile system 340. Home wireless network 320 includes home agent 324 and home authentication, authorization, and accounting (AAA) server 325. Wireless communication device 301 in is communication with wireless access node 322 over wireless communication link 311. Wireless access node 322 communicates with PDSN 323 over communication link 312. PDSN 323 in is communication with home wireless network 320 over wireless communication link 313. Home wireless network 320 communicates with user profile system 340 over communication link 314. In the exemplary embodiment of FIG. 3, wireless communication device 301 comprises a dual-mode communication device capable of communicating with third generation (3G) and fourth generation (4G) wireless networks.

Figure 4:
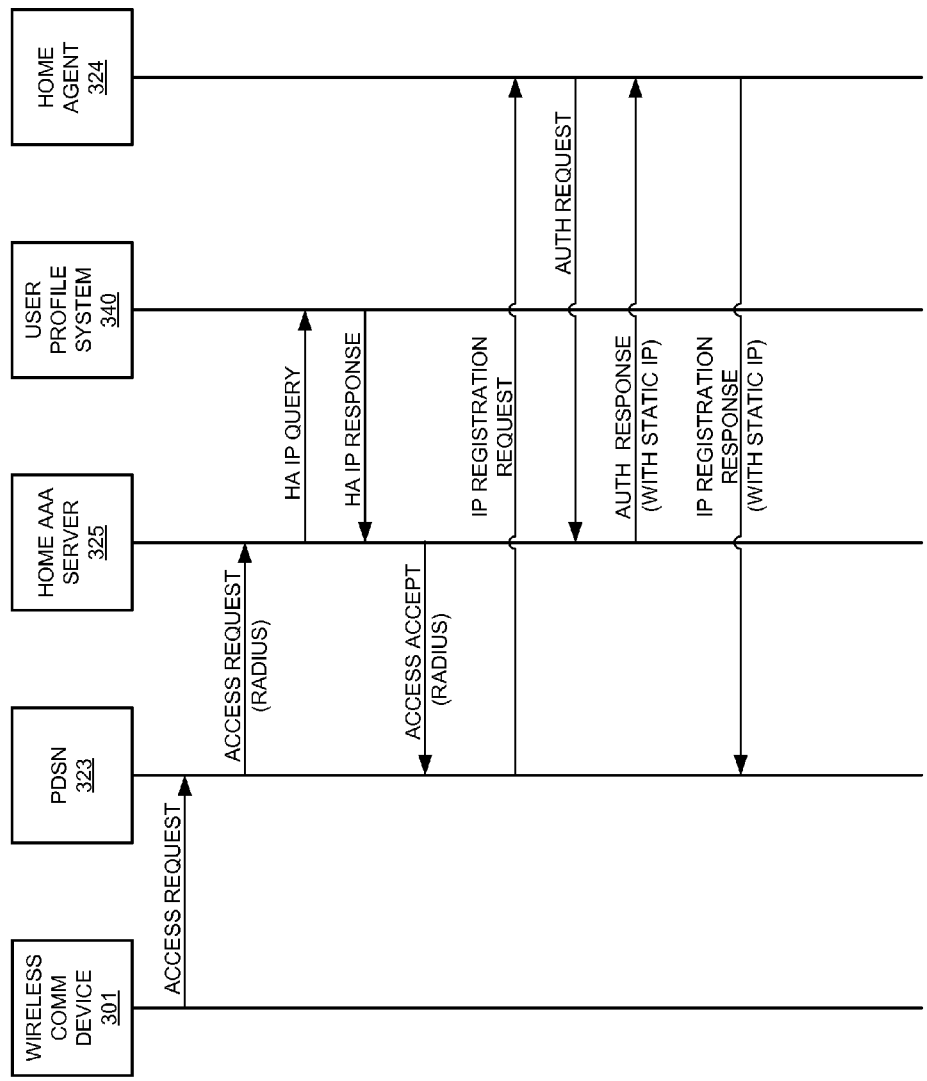
FIG. 4 is a sequence diagram that illustrates an operation of the communication system in an exemplary embodiment.

FIG. 4 is a sequence diagram that illustrates an operation of communication system 300 in an exemplary embodiment. The sequence diagram of FIG. 4 depicts a scenario in which dual-mode 3G/4G wireless communication device 301 is operating in a home region of home wireless network 320 and has an associated home agent 324 and home AAA server 325 in network 320. In order to establish Mobile IP access and acquire a static IP address, wireless communication device 301 transfers an access request to PDSN 323 in a CDMA wireless network.

PDSN 323 receives the access request from wireless communication device 301. The access request typically includes access credentials in the form of a username and password, security certificate, or some other token for authenticating wireless communication device 301 to home wireless network 320. In addition, the access request includes a user identifier for use with user profile system 340, which could comprise the access credentials in some examples. In other examples, the user identifier could comprise a unique identifier of either wireless communication device 301 or its user. Upon receipt of the access request from wireless communication device 301, PDSN 323 transfers an access request to home AAA server 325 in a RADIUS Access-Request message.

Home AAA server 325 processes the access request to determine the user identifier for wireless communication device 301. Home AAA server 325 then queries user profile system 340 for the IP address of the home agent 324 associated with the user identifier. For example, user profile system 340 could comprise a relational database that associates user identifiers with IP addresses of corresponding home agents. In addition, user profile system 340 could also store a static packet address for wireless communication device 301 in association with the user identifier for device 301. In response to the query, user profile system 340 returns the IP address of the home agent 324 and the static packet address for wireless communication device 301.

Home AAA server 325 caches or stores the static packet address for wireless communication device 301 in a memory device. Home AAA server 325 also typically processes the user credentials and other information contained in the Access-Request message to authenticate the user of wireless communication device 301 and authorize the user for network access. Upon successful authentication of the user, home AAA server 325 formulates a RADIUS Access-Accept message that includes the IP address of the home agent 324. Home AAA server 325 then transfers the Access-Accept message to PDSN 323.

PDSN 323 receives the Access-Accept message and processes the response to determine the IP address of the home agent 324 for wireless communication device 301. PDSN 323 then transfers a Mobile IP Registration Request to home agent 324. In formulating the Mobile IP Registration Request, PDSN 323 again includes the user identifier for wireless communication device 301.

Home agent 324 processes the Mobile IP Registration Request and determines the user identifier for wireless communication device 301 associated with the request. Home agent 301 then transfers an authorization request to home AAA server 325, such as another RADIUS Access-Request message. Home agent 324 includes the user identifier for wireless communication device 301 in the authorization request. In some examples, the request may also include a flag, bit, or other indicator to signal to home AAA server 325 a request for a static IP address for device 301. In other examples, home AAA server 325 is configured to always return the static packet address if one is associated with the user identifier. In this example, since home AAA server 325 stored the static IP address for device 301 in response to querying user profile system 340, home AAA server 325 retrieves the static packet address from a memory device based on the user identifier in the authentication request. However, in some examples, home AAA server 325 could transfer a second query to user profile system 340 at this time to request the static IP address for wireless communication device 301. In either event, once home AAA server 325 has retrieved the static IP address, home AAA server 325 returns an authentication response to home agent 324 that includes the static IP address for wireless communication device 301.

Home agent 324 processes the authentication response to determine the static IP address for wireless communication device 301. Home agent 324 then includes the static IP address in a Mobile IP Registration Response and transfers the response to the PDSN 323. Typically, the Mobile IP Registration Response also includes other necessary attributes for Mobile IP registration. PDSN 323 receives the Mobile IP Registration Response along with the included static IP address for wireless communication device 301. In this manner, dual-mode 3G/4G device 301 acquires the static packet address assigned to it in user profile system 340.

Figure 5:
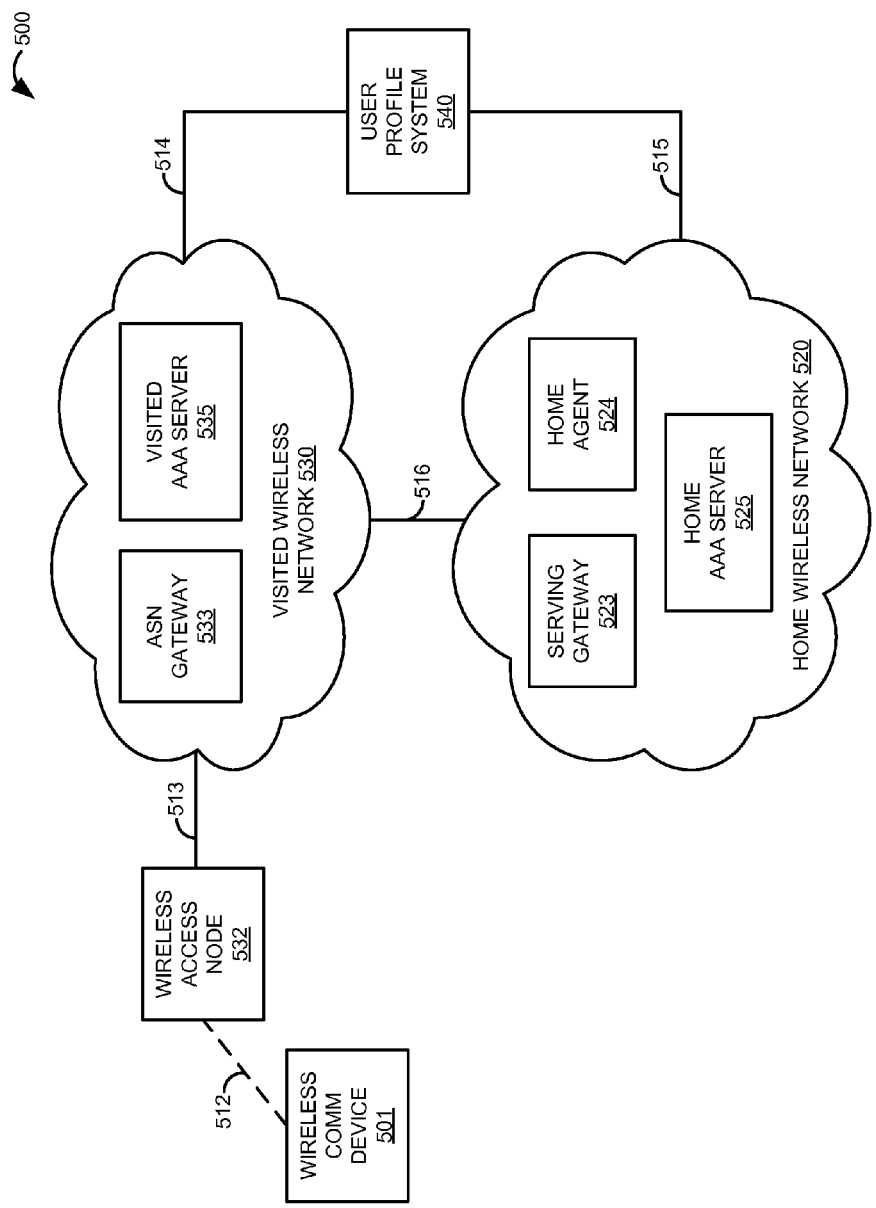
FIG. 5 is a block diagram that illustrates a communication system in an exemplary embodiment.

FIG. 5 is a block diagram that illustrates communication system 500 in an exemplary embodiment. Communication system 500 includes wireless communication device 501, wireless access node 532, home wireless network 520, visited wireless network 530, and user profile system 540. Home wireless network 520 includes serving gateway 523, home agent 524, and home AAA server 525. Visited wireless network 530 includes access service network (ASN) gateway 533 and visited AAA server 535. Wireless communication device 501 in is communication with wireless access node 532 over wireless communication link 512. Wireless access node 532 communicates with visited wireless network 530 over communication link 513. Home wireless network 520 communicates with user profile system 540 over communication link 515, while visited wireless network 530 communicates with user profile system 540 over communication link 514. In addition, visited wireless network 530 and home wireless network 520 are in communication over communication link 516. In the exemplary embodiment of FIG. 5, wireless communication device 501 comprises a dual-mode communication device capable of communicating with third generation (3G) and fourth generation (4G) wireless networks, and both home wireless network 520 and visited wireless network 530 comprise 4G WiMAX wireless access networks.

Figure 6:
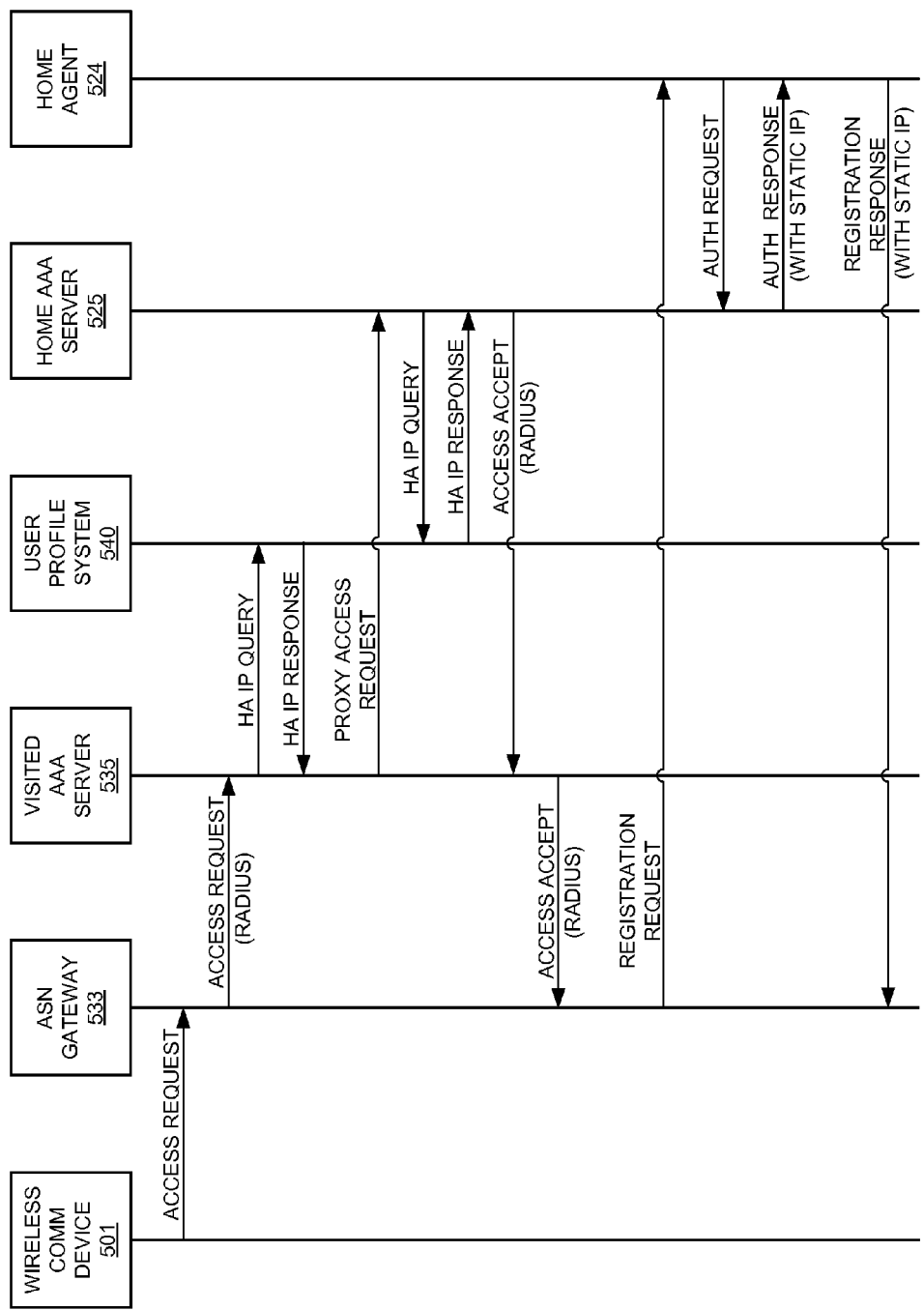
FIG. 6 is a sequence diagram that illustrates an operation of the communication system in an exemplary embodiment.

FIG. 6 is a sequence diagram that illustrates an operation of communication system 500 in an exemplary embodiment. The sequence diagram of FIG. 6 depicts a scenario in which dual-mode 3G/4G wireless communication device 501 has an associated home agent 524 and home AAA server 525 in home wireless network 520, and device 501 is roaming within a region of visited wireless network 530. In order to establish network access and acquire a static IP address, wireless communication device 501 transfers an access request to ASN gateway 533 in visited wireless network 530. In this example, the access request comprises a network service request for Simple IP access on the WiMAX visited wireless network 530.

ASN gateway 533 receives the access request from wireless communication device 501. The access request includes a user identifier for use with user profile system 540, which could comprise a unique identifier of either wireless communication device 501 or its user. Upon receipt of the access request from wireless communication device 501, ASN gateway 533 transfers an access request to visited AAA server 535 in a RADIUS Access-Request message, which also includes the user identifier.

Visited AAA server 535 processes the access request to determine the user identifier for wireless communication device 501. Visited AAA server 535 then transfers a first query to user profile system 540 for the IP address of the home agent 524 associated with the user identifier. In response to the query, user profile system 540 returns the IP address of the home agent 524 for wireless communication device 501.

Upon receipt of the response from user profile system 540, visited AAA server 535 processes the IP address of the home agent 524 to translate the address of the home agent 524 into an address of the home AAA server 525. In some examples, visited AAA server 535 translates the IP address of the home agent 524 into the address of the home AAA server 525 by querying a database that relates IP addresses of home agents to addresses of home AAA servers. Once visited AAA server 535 determines the address of home AAA server 525, visited AAA server 535 proxies the Access-Request to the home AAA server 525.

Upon receipt of the proxied RADIUS Access-Request message from visited AAA server 535, home AAA server 525 processes the access request to determine the user identifier for wireless communication device 501. Home AAA server 525 then transfers a second query to user profile system 540 for the IP address of the home agent 524 associated with the user identifier. In addition, the second query could also request a static packet address for wireless communication device 501 in association with the user identifier for device 501. In response to the second query, user profile system 540 returns the IP address of the home agent 524 and the static packet address for wireless communication device 501.

Home AAA server 525 caches or stores the static packet address for wireless communication device 501 in a memory. Home AAA server 525 also typically processes the user credentials and other information contained in the Access-Request message to authenticate the user of wireless communication device 501 and authorize the user for network access. Upon successful authentication of the user, home AAA server 525 formulates a RADIUS Access-Accept message, which includes the IP address of the home agent 524. Home AAA server 525 then transfers the Access-Accept message to ASN gateway 533.

ASN gateway 533 receives the Access-Accept message and processes the response to determine the IP address of the home agent 524 for wireless communication device 501. ASN gateway 533 then transfers a registration request to home agent 524. In formulating the registration request, ASN gateway 533 again includes the user identifier for wireless communication device 501.

Home agent 524 processes the registration request and determines the user identifier for wireless communication device 501 associated with the request. Home agent 524 then transfers an authentication request to home AAA server 525, such as another RADIUS Access-Request. Home agent 524 includes the user identifier for wireless communication device 501 in the authentication request. In this example, since home AAA server 525 stored the static IP address for device 501 in response to querying user profile system 540, home AAA server 525 retrieves the static packet address from a memory device based on the user identifier in the authentication request. Once home AAA server 525 has retrieved the static IP address, home AAA server 525 returns an authentication response to home agent 524 that includes the static IP address for wireless communication device 501.

Home agent 524 processes the authentication response to determine the static IP address for wireless communication device 501. Home agent 524 then includes the static IP address in a registration response and transfers the response for delivery to ASN gateway 533. Typically, the registration response includes other necessary attributes for registration. ASN gateway 533 receives the registration response along with the included static IP address for wireless communication device 501.

In some examples, wireless communication device 501 could be associated with a plurality of home AAA servers and a plurality of home agents. For example, wireless communication device 501 could be associated with a second home agent and a second home AAA server in a 3G wireless access network in addition to being associated with home agent 524 and home AAA server 525 in the 4G WiMAX home wireless network 520. Advantageously, if wireless communication device 501 is associated with multiple home AAA servers and/or multiple home agents, the methods described herein ensure that the correct home AAA server 525 and home agent 524 are contacted. In this manner, dual-mode 3G/4G wireless communication device 501 acquires the static packet address for device 501 as assigned in user profile system 540, even when device 501 is operating in a visited region.

Figure 7:
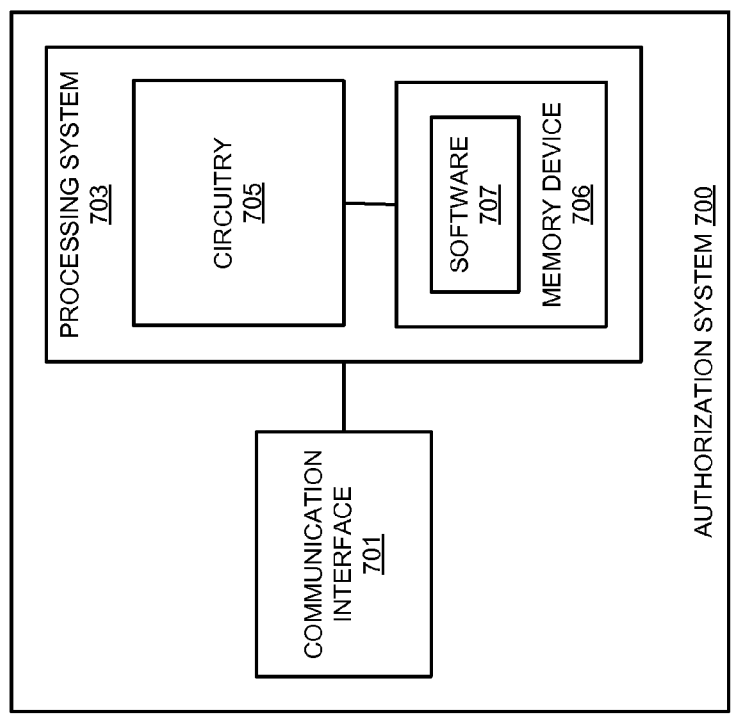
FIG. 7 is a block diagram that illustrates an authorization system.

FIG. 7 is a block diagram that illustrates authorization system 700. Authorization system 700 provides an example of authorization system 125, although system 125 may use alternative configurations. Authorization system 700 comprises communication interface 701 and processing system 703. Processing system 703 is linked to communication interface 701. Processing system 703 includes processing circuitry 705 and memory device 706 that stores operating software 707.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. Communication interface 701 is configured to receive a first authorization request for a wireless communication device, wherein the first authorization request includes a user identifier. Further, communication interface 701 is configured to transfer a first query for delivery to a user profile system, wherein the first query includes the user identifier, receive a packet address of a home agent associated with the wireless communication device and a static packet address for the wireless communication device in response to the first query, and transfer a first authorization response, wherein the first authorization response includes the packet address of the home agent. In addition, communication interface 701 is configured to receive an authentication request transferred from the home agent, wherein the authentication request includes the user identifier, and transfer an authentication response for delivery to the home agent, wherein the authentication response includes the static packet address for the wireless communication device.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate as described herein for authorization system 125. In particular, operating software 707 directs processing system 703 to direct communication interface 701 to receive a first authorization request for a wireless communication device, transfer a first query for delivery to a user profile system, receive a packet address of a home agent associated with the wireless communication device and a static packet address for the wireless communication device, and transfer a first authorization response, wherein the first authorization response includes the packet address of the home agent. Further, operating software 707 directs processing system 703 to direct communication interface 701 to receive an authentication request transferred from the home agent, wherein the authentication request includes the user identifier. Operating software 707 directs processing system 703 to process the authentication request to determine the static packet address for the wireless communication device. In addition, operating software 707 directs processing system 703 to direct communication interface 701 to transfer an authentication response for delivery to the home agent, wherein the authentication response includes the static packet address for the wireless communication device, and wherein the home agent is configured to transfer a registration response comprising the static packet address for delivery to the service node.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an authorization system in a home wireless network, wherein a wireless communication device associated with the home wireless network transfers a network service request to a service node to acquire a static packet address for the wireless communication device, the method comprising:
    receiving a first authorization request for the wireless communication device, wherein the first authorization request includes a user identifier;
    wherein receiving the first authorization request for the wireless communication device comprises receiving the first authorization request from a visited authorization system in a visited wireless network;
    transferring a first query for delivery to a user profile system, wherein the first query includes the user identifier;
    receiving a packet address of a home agent associated with the wireless communication device and the static packet address for the wireless communication device in response to the first query;
transferring a first authorization response, wherein the first authorization response includes the packet address of the home agent;
    receiving an authentication request transferred from the home agent, wherein the authentication request includes the user identifier;
    processing the authentication request to determine the static packet address for the wireless communication device; and
    transferring an authentication response for delivery to the home agent, wherein the authentication response includes the static packet address for the wireless communication device, and wherein the home agent is configured to transfer a registration response comprising the static packet address for delivery to the service node.

2. The method of claim 1 wherein the wireless communication device is associated with a plurality of home authorization systems in the home wireless network and wherein the authorization system in the home wireless network comprises one of the plurality of home authorization systems.

3. The method of claim 1 wherein the wireless communication device is associated with a plurality of home agents in the home wireless network and wherein the home agent associated with the wireless communication device comprises one of the plurality of home agents.

4. The method of claim 1 wherein receiving the first authorization request for the wireless communication device comprises receiving the first authorization request transmitted from the service node.

5. The method of claim 1 wherein the visited authorization system is configured to query the user profile system for the packet address of the home agent associated with the wireless communication device, translate the packet address of the home agent into an address of the authorization system in the home wireless network, and transfer the first authorization request for delivery to the authorization system in the home wireless network.

6. The method of claim 1 further comprising processing the packet address of the home agent and the static packet address for the wireless communication device to determine an error event.

7. The method of claim 6 wherein processing the packet address of the home agent and the static packet address for the wireless communication device to determine the error event comprises determining that a packet address pool of the home agent does not include the static packet address for the wireless communication device.

8. The method of claim 1 wherein the authorization system in the home wireless network comprises an authentication, authorization, and accounting (AAA) server.

9. The method of claim 1 wherein the wireless communication device comprises a dual-mode communication device capable of communicating with third generation (3G) and fourth generation (4G) wireless networks.

10. An authorization system in a home wireless network, wherein a wireless communication device associated with the home wireless network transfers a network service request to a service node to acquire a static packet address for the wireless communication device, the authorization system comprising:
    a communication interface configured to receive a first authorization request for the wireless communication device, wherein the first authorization request includes a user identifier;
    the communication interface configured to transfer a first query for delivery to a user profile system, wherein the first query includes the user identifier, receive a packet address of a home agent associated with the wireless communication device and the static packet address for the wireless communication device in response to the first query, and transfer a first authorization response, wherein the first authorization response includes the packet address of the home agent;
    a processing system configured to direct the communication interface to receive the first authorization request for the wireless communication device, transfer the first query for delivery to the user profile system, receive the packet address of the home agent associated with the wireless communication device and the static packet address for the wireless communication device, and transfer the first authorization response, wherein the first authorization response includes the packet address of the home agent;

wherein the communication interface configured to receive the first authorization request for the wireless communication device comprises the communication interface configured to receive the first authorization request transmitted from a visited authorization system in a visited wireless network;

the communication interface configured to receive an authentication request transferred from the home agent, wherein the authentication request includes the user identifier;

the processing system configured to process the authentication request to determine the static packet address for the wireless communication device; and the communication interface configured to transfer an authentication response for delivery to the home agent, wherein the authentication response includes the static packet address for the wireless communication device, and wherein the home agent is configured to transfer a registration response comprising the static packet address for delivery to the service node.

11. The system of claim 10 wherein the wireless communication device is associated with a plurality of home authorization systems in the home wireless network and wherein the authorization system in the home wireless network comprises one of the plurality of home authorization systems.

12. The system of claim 10 wherein the wireless communication device is associated with a plurality of home agents in the home wireless network and wherein the home agent associated with the wireless communication device comprises one of the plurality of home agents.

13. The system of claim 10 wherein the communication interface configured to receive the first authorization request for the wireless communication device comprises the communication interface configured to receive the first authorization transmitted from the service node.

14. The system of claim 10 wherein the visited authorization system is configured to query the user profile system for the packet address of the home agent associated with the wireless communication device, translate the packet address of the home agent into an address of the authorization system in the home wireless network, and transfer the first authorization request for delivery to the authorization system in the home wireless network.

15. The system of claim 10 further comprising the processing system configured to process the packet address of the home agent and the static packet address for the wireless communication device to determine an error event.

16. The system of claim 15 wherein the processing system configured to process the packet address of the home agent and the static packet address for the wireless communication device to determine the error event comprises the processing system configured to determine that a packet address pool of the home agent does not include the static packet address for the wireless communication device.

17. The system of claim 10 wherein the authorization system in the home wireless network comprises an authentication, authorization, and accounting (AAA) server.

18. A method of acquiring a static packet address for a wireless communication device in a communication system comprising a first wireless network and a second wireless network, the method comprising:

in the wireless communication device, transferring a network service request for delivery to a service node in the first wireless network, wherein the network service request includes a user identifier;

in the service node, transferring a first authorization request for delivery to a first authorization system in the first wireless network, wherein the first authorization request includes the user identifier;

in the first authorization system, transferring a first query for delivery to a first user profile system wherein the first query includes the user identifier, and receiving a packet address of a home agent associated with the user identifier in response to the first query;

in the first authorization system, processing the packet address of the home agent to determine whether the home agent is associated with the first wireless network or the second wireless network, and if the home agent is associated with the second wireless network, transferring a second authorization request for delivery to a second authorization system in the second wireless network, wherein the second authorization request includes the user identifier;

in the second authorization system, transferring a second query for delivery to a second user profile system wherein the second query includes the user identifier, and receiving the packet address of the home agent and the static packet address for the wireless communication device in response to the second query;

in the first authorization system, receiving a first authorization response transmitted from the second authorization system, wherein the first authorization response includes the packet address of the home agent;

in the service node, receiving a second authorization response transmitted from the first authorization system, wherein the second authorization response includes the packet address of the home agent, and transferring a registration request for delivery to the home agent;

in the home agent, transferring an authentication request for delivery to the second authorization server and receiving an authentication response transmitted from the second authorization server, wherein the authentication response includes the static packet address for the wireless communication device; and in the home agent, transferring a registration response to the service node, wherein the registration response includes the static packet address for the wireless communication device.

* * * * *